United States Patent [19]

Frieberg

[11] 4,249,140
[45] Feb. 3, 1981

[54] CLOSED LOOP RESONATOR FEEDBACK SYSTEM

[75] Inventor: Robert J. Frieberg, Palm Beach Gardens, Fla.

[73] Assignee: United Technologies Corporation, Hartford, Conn.

[21] Appl. No.: 911,259

[22] Filed: May 31, 1978

[51] Int. Cl.³ .............................................. H01S 3/081
[52] U.S. Cl. ........................... 331/94.5 C; 331/94.5 D
[58] Field of Search ...................... 331/94.5 C, 94.5 S

[56] References Cited

U.S. PATENT DOCUMENTS 3,969,687  7/1979  Freiberg et al. ................ 331/94.5 C

*Primary Examiner*—William L. Sikes
*Assistant Examiner*—Leon Scott
*Attorney, Agent, or Firm*—Lawrence A. Cavanaugh

[57] ABSTRACT

A resonator feedback system is disclosed wherein the output from a resonator having adaptive optics is monitored by a detector within a feedback loop to provide electrical control signals to actuators attached to the adaptive optics to control the phase of the radiation within the resonator to produce an output beam having a near diffraction limited distribution. In one embodiment, a portion of the output beam is phase modulated at discrete frequencies and focused through an aperture onto a detector. Far field amplitude fluctuations at the focal point resulting from phase perturbations of the radiation within the resonator produces an amplitude varying electrical input signal which is synchronously detected with multidither signals utilized to impress the phase modulation to produce multicorrection signals. Actuators attached to the adaptive optics of the resonator are responsive to the multicorrection signals to provide phase corrections to the radiation within the resonator to produce an output beam having a near diffraction limited distribution. In a further embodiment, the radiation within the resonator is phase modulated and phase corrected to produce an output beam having a near diffraction limited distribution. In a further embodiment, radiation reflected from a remote target is monitored in accordance with the present invention to provide phase corrections to the radiation within the resonator to compensate for phase distortion in the output beam resulting from changes in the index of refraction of the atmosphere in the path of the output beam resulting from thermal blooming or the like.

18 Claims, 3 Drawing Figures

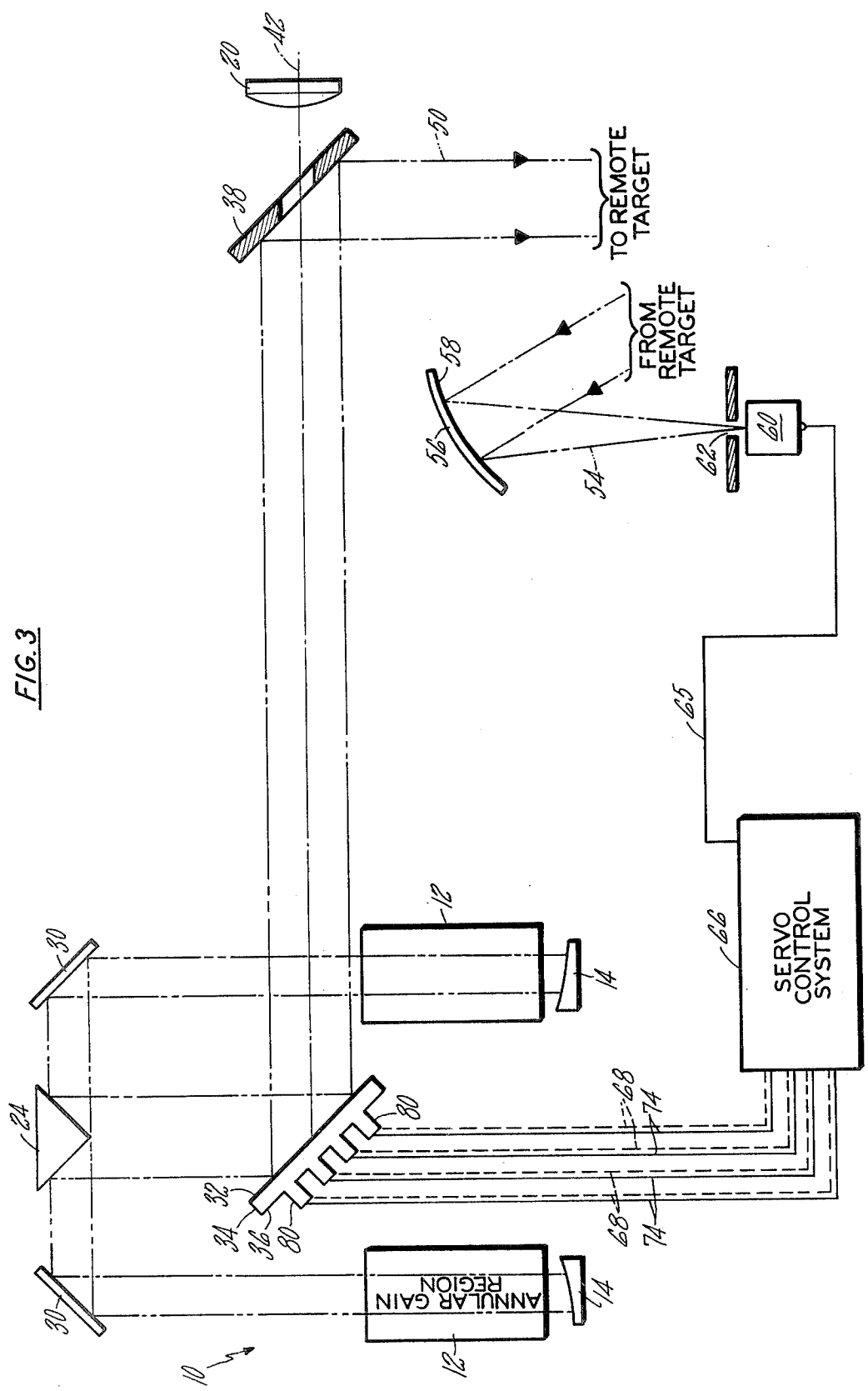

ns to the beam as it passes through an atmosphere to a remote target. This compensation is provided outside the laser resonator. See also U.S. Pat. Nos. 3,731,103, 3,764,213 and 3,727,223.

The present invention provides a means for overcoming the deficiencies associated with presently known high power optical resonators. This is particularly true of the high power annular resonator configurations typically employed in chemical lasers which utilized intracavity axicons. In these resonators temporally varying phase perturbations resulting from imperfections in the axicon surface figure, optical misalignment, thermally induced mirror distortions, and refractive index variations within the gain medium destroy the mode discrimination properties of the resonator thereby degrading the optical beam quality of the output. The present invention provides a means for compensating for such temporal variations by utilizing an actively deformable resonator mirror in conjunction with a closed loop servo system to control the phase distribution of the radiation within the resonator by modifying the surface configuration of the mirror.

CLOSED LOOP RESONATOR FEEDBACK SYSTEM

BACKGROUND OF THE INVENTION

This invention relates to resonator systems having adaptive optics and more particularly such resonator systems capable of actively generating phase corrections to intracavity radiation to compensate for temporally varying phase perturbations.

An essential requirement of a laser resonator adapted for producing an output beam having high energy is the capability to efficiently extract energy from a gain medium and simultaneously produce a near diffraction limited output beam. For example, in chemical laser systems, mode discrimination by the resonator as well as optical quality of the output beam are often compromised as a result of temporally varying refractive index perturbations within the gain medium, misalignment of the optical elements defining the laser resonator and thermally induced distortions of the optical elements. Since these laser systems are sensitive to misalignment some sort of dynamic alignment control is required.

Feedback systems have been utilized in prior art devices to obtain frequency stabilization of the output beam. As disclosed by Rowley et al in "Nature", London, Vol. 200, page 745, Nov. 23, 1963, typically one of the mirrors defining the optical cavity is dithered to produce a small amplitude modulation of the output beam, a portion of which is directed to a detector. Synchronous mixing of the output of the detector with the dithering signal produces an error signal which cooperates with a servo control mechanism to activate a transducer attached to one of the mirrors defining the optical cavity to change the relative separation of the mirrors defining the cavity to maintain the output beam at a stabilized frequency.

Additionally Forster in U.S. Pat. No. 3,471,803 filed Apr. 28, 1967 discloses a system for stabilizing the frequency of the output beam from a laser resonator. The laser system incorporates a first laser having optical elements capable of being adjusted to tune the laser to a particular frequency and a single mode laser system adapted for producing an output beam having a stable frequency which is utilized as a reference source. Samples of the output beam of both the tunable laser and the stabilized laser are mixed to produce an output signal which is directed to a piezoelectrically driven optical element of the tunable laser. In operation the separation between the optical elements defining the optical cavity of the tunable laser is continuously adjusted to maintain a stabilized output spectrum. See also U.S. Pat. No. 3,471,804.

Essentially all of the prior art devices adapted for producing an output beam having a stabilized frequency control the separation between the mirrors defining the optical cavity to obtain the stabilization. The prior art devices are not adapted for compensating for phase variations in the radiation within the cavity produced by refractive index perturbations within the gain medium. Additionally feedback systems for phase compensation of phase perturbation to intracavity radiation resulting from misalignment of the optical cavity due to thermally induced mirror distortions and/or vibrations are not available. However, O'Meara in U.S. Pat. No. 4,016,451 filed June 24, 1974, discloses an adaptive energy telescope system capable of providing phase shift to the output beam to compensate for phase perturbations to the beam as it passes through an atmosphere to a remote target. This compensation is provided outside the laser resonator. See also U.S. Pat. Nos. 3,731,103, 3,764,213 and 3,727,223.

SUMMARY OF THE INVENTION

An object of the present invention is to provide, from a resonator, an output beam having high power with an intensity distribution in the far field which is near diffraction limited.

According to the present invention a portion of an output beam from a resonator having an optical element capable of being actively deformed is phase modulated by first actuator means and focused by a collector mirror onto a detector producing an electrical input signal having amplitude variations proportional to far field amplitude fluctuation in the beam resulting from temporally varying phase perturbations of the radiation within the resonator. A servo control system adapted for providing a multidither signal to the first actuator means synchronously monitors the electrical input signal and the multidither signals to provide multicorrection signals to second actuator means attached to the optical element of the resonator capable of being deformed. The second actuator means is adapted for deforming said optical element to produce phase changes in the radiation within the resonator to compensate for temporally varying phase perturbations therein to provide an output beam having near diffraction limited characteristics. In one embodiment of the present invention, the detector is adapted for sensing radiation reflected from a remote target to provide multicorrection signals to the second actuator means for producing phase corrections of the radiation within the resonator to compensate for temporally varying phase perturbation along the path of the output beam. The preferred embodiment of the present invention comprises a resonator capable of providing an output beam and having an optical element adapted for being actively deformed, a scraper mirror adapted for intercepting a portion of an output beam to provide a monitor beam to a feedback loop and a feedback loop, including a collector mirror adapted for focusing the monitor beam onto a detector, first actuator means attached to the collector mirror adapted for dithering the collector mirror to impress a phase modulation on the monitor beam, a detector adapted for sensing amplitude variation in the focused monitor beam to produce an electrical input signal, a servo control system adapted for providing multidither signals to the first actuator means and for synchronously monitoring the electrical input signal with the multidither signals to produce multicorrection signals, and second actuator means attached to the optical element of the resonator capable of being actively deformed wherein the second actuator means, responsive to the multicorrection signals, is adapted for deforming the optical element to provide phase corrections to the radiation oscillating within the resonator to compensate for temporally varying phase perturbation therein.

In a further embodiment, the first and second actuator means are attached to the optical element of the resonator capable of being deformed to provide both phase modulation and phase correction to the radiation within the resonator to provide an output beam having near diffraction limited characteristics.

A primary feature of the present invention is the actively deformable optical elements, within the resonator, adapted for modifying the phase distribution of radiation within the resonator to correct for temporally varying phase perturbations therein. Additionally a scraper mirror, having a plurality of apertures, is adapted for reflecting a major portion of the output beam to a target while passing a minor portion therethrough to provide a monitor beam to the collector mirror. The collector mirror is adapted for focusing the monitor beam onto the detector to transform near field phase modulations in the output beam into far field amplitude modulations. Additionally the monitor beam is focused onto the detector through an aperture in a plate positioned juxtaposed the detector having a diameter typically corresponding to $1/e^2$ of the intensity distribution of the central lobe of the focused beam. Also, the servo control system includes circuitry for providing multidither signals to the first actuator means to impose spatial phase modulation, typically one-tenth of a wavelength at several discrete dither frequencies none of which are harmonics of the others, upon the monitor beam. Additionally, hill climbing circuitry within the servo control system monitors the electrical input signal from the detector and the multidither signal to the first actuator means to provide multicorrection signals to the second actuator means. The hill climbing circuitry is adapted for controlling the multicorrection signals to maintain a near diffraction limited monitor beam on the detector.

An advantage of the present invention is that a near diffraction limited output beam is obtained from a resonator adapted for accommodating a gain medium capable of producing high energy radiation in spite of adverse environmental conditions, temporally varying resonator misalignment, optical surface distortions, and temporal variations of the active gain medium. Additionally the ability to actively deform an optical element of the resonator enhances mode discrimination of resonators adapted for providing output beams having high power. Also the resonator performs at a reduced sensitivity to optical misalignment and fabrication tolerances of the optical components of the resonator are relaxed. Additionally coolant requirements on the high power optics of the resonator are relaxed and the deleterious influence of an adverse environment either within or without the resonator on the optical quality of the output beam is minimized. In the preferred embodiment only the monitor beam is phase modulated and the output beam is transmitted unmodulated.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWING

FIG. 3 is a simplified schematic of an embodiment of the system as shown in FIG. 2 wherein the feedback loop includes a remote target.

DESCRIPTION OF THE PREFERRED EMBODIMENT

Figure 1:
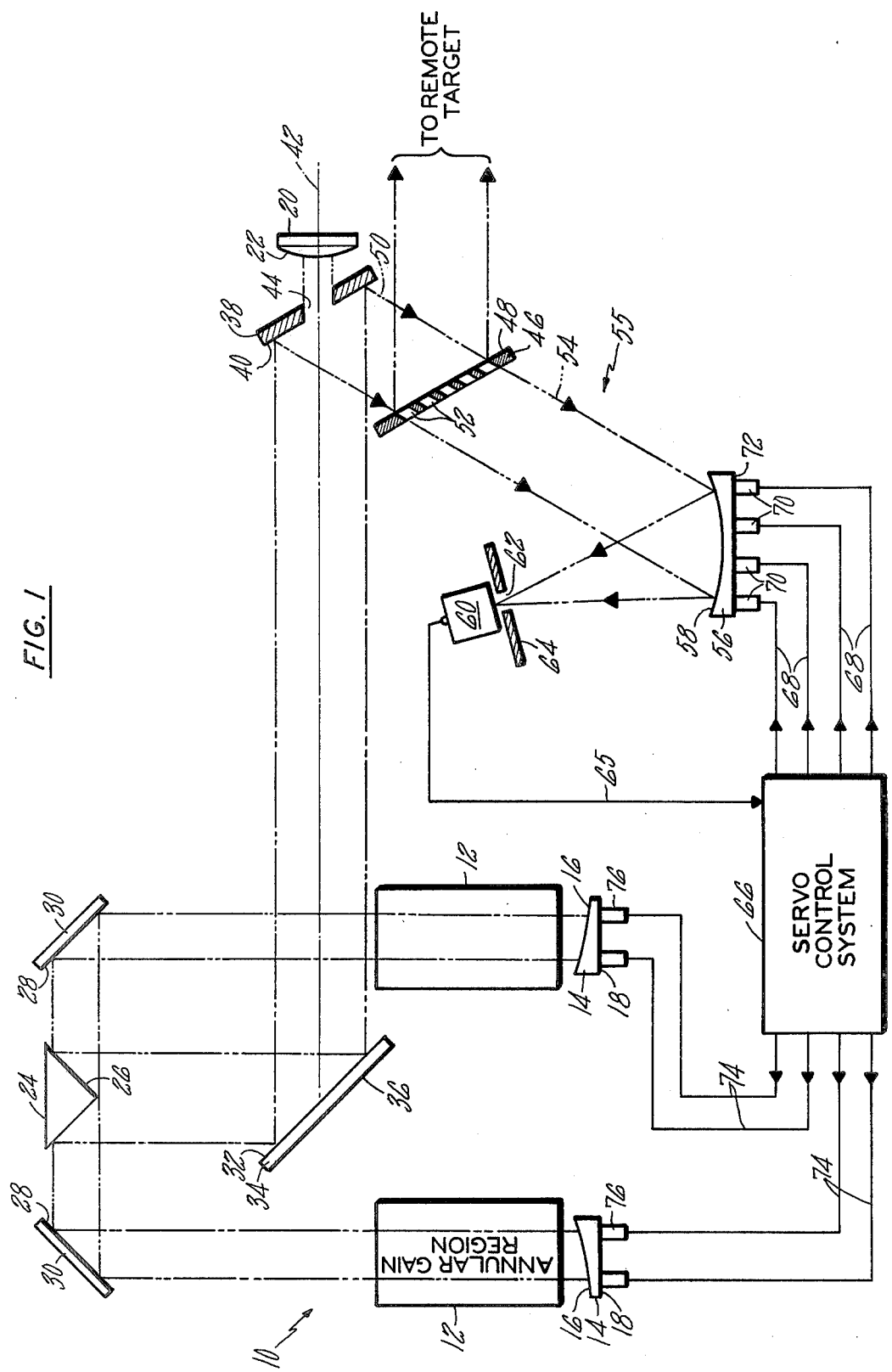
FIG. 1 is a simplified schematic of a resonator feedback system wherein both the resonator and the feedback loop have adaptive optics in accordance with the present invention.

FIG. 1 shows a simplified schematic of a closed loop resonator feedback system in accordance with the present invention having optical elements capable of being actively deformed. A split mode annular resonator 10, capable of accommodating an annular gain medium 12 is defined at one end by a first reflector 14, preferably with a toroidal configuration, having a reflective surface 16 and a back surface 18, and at the other end by a second reflector 20 having a second reflective surface 22. Disposed within the resonator is a conical reflector 24 having reflective surfaces 26 in optical communication with the reflective surface 16 of the first reflector via a reflective surface 28 on a toroidal compacting mirror 30 and with the reflective surface 22 of the second reflector 20 via a reflective surface 32 on a folding mirror 34 having a back surface 36. A coupling mirror 38, having an annular reflective surface 40 angularly disposed to an optical axis 42 of the resonator, is positioned within the resonator 10 between the folding mirror 34 and the second reflector 20. The reflective surface 22 of the second reflector 20 is in optical communication with the reflective surface 32 of the folding mirror through an aperture 44 centrally disposed in the coupling mirror 38. A scraper mirror 46 positioned external to the resonator, having a reflective surface 48 in optical communication with the reflective surface 40 of the coupling mirror 38 is adapted for directing a major portion of an output beam 50, coupled out of the resonator by the coupling mirror, to a remote target (not shown) and for passing a minor portion of the output beam through a multiplicity of apertures 52 to form a monitor beam 54. The system further includes a feedback loop 55 with a collector mirror 56 having a concave reflective surface 58 in optical communication with the reflective surface 40 of the coupling mirror through the apertures 52 within the scraper mirror, a detector 60, in optical communication with the concave reflective surface 58 through an aperture 62 in a plate 64, capable of providing an electrical input signal 65 and a servo control system 66 adapted for providing multidither signals 68 to a multiplicity of dither transducers 70 attached to the back surface 72 of the first mirror 56 and for synchronously monitoring the electrical input signal 65 with the multidither signals 68 to provide multicorrection signals 74 to phase control transducers 76 located on the back surface 18 of the first reflector 14. The unstable resonator 10 as shown in FIG. 1 is similar to the standing wave unstable resonator for radial flow of lasers as disclosed by Freiberg et al in U.S. Pat. No. 3,969,687 filed Apr. 14, 1975 which is incorporated herein by reference. It is to be recognized that although the present invention is particularly adapted for use with unstable resonators capable of accommodating an annular gain medium, as for example the resonators typically utilized for chemical laser systems, the invention may be utilized with any resonator configuration.

In operation the output beam 50 is coupled out of the resonator 10 by the reflective surface 40 on the coupling mirror 38 and is directed to the scraper mirror 46 where a major portion of the beam passes to a remote target (not shown) while a minor portion of the beam passes through the plurality of apertures 52 to form the monitor beam 54. The monitor beam passes to the collector mirror 56 and is focused by the concave reflective surface 58 through the aperture 62 in the plate 64 onto the detector 60 positioned juxtaposed the plate. The aperture 62 preferably has a diameter corresponding to approximately the $1/e^2$ point of the central lobe in the intensity distribution of the monitor beam in the focal plane of the concave reflective surface 58. The aperture 62 is preferably located in the focal plane of the collector mirror symmetrically about the focal zone of the first mirror. During the operation of a chemical laser system, temporally varying phase perturbations within the resonator results in phase variation in the radiation oscillating within the resonator which produces phase variation in the near field of the output beam and amplitude variation in the far field. In the present invention the near field distribution is Fourier transformed at the focal plane of the concave reflective surface 58 into the far field to provide amplitude fluctuations in the intensity of the monitor beam incident onto the detector corresponding to the phase perturbations in the output beam. In the preferred embodiment the phase perturbations in the output beam are a result of phase perturbations within the resonator. The detector 60 senses the fluctuating amplitude variations in the focused monitor beam and generates an electrical input signal 65 proportional to the amplitude variations which is directed to the control system 66. The control system includes circuitry well known in the art for providing multidither signals to the plurality of dither transducers 70 attached to the back surface 72 of the collector mirror 56. Sinusoidal dither signals are provided to each of the dither transducers to deform that portion of the collector mirror to which the transducer is attached to impress sinusoidal phase modulations, typically corresponding to approximately one-tenth of a wavelength, onto the monitor beam. Each of the dither signals is provided at a discrete frequency which does not contain any harmonics of the other dither signals to provide a spatial phase modulation of the monitor beam at several discrete dither frequencies. The spatial format for the multidither phase modulation of the monitor beam preferably consists of the displacement of discrete mirror zones within the collector mirror but it is to be recognized that continuous mirror zones or modes may also be utilized. In the preferred embodiment the dither and phase control transducers are piezoelectric transducers.

The electrical input signal 65 generated by the detector 60 is synchronously monitored in the servo control system at each of the dither frequencies with appropriate hill climbing circuitry well known in the art to produce direct current multicorrection signals 74 having amplitude and phase information proportional to the amount and radial position of the phase perturbations within the resonator. The multicorrection signals are passed to the phase control transducers 76 attached to the back surface 18 of the first reflector 14 defining one end of the resonator 10. The phase control transducers 76 appropriately modify the reflective surface 16 of the first reflector to induce phase changes in the radiation oscillating within the resonator to compensate for the temporally varying phase perturbation originating therein. It is to be recognized that the phase control transducers may be attached to the back surface of any of the optical components defining the resonator which are capable of being actively deformed.

In operation, the monitor beam is focused through the aperture 62 of the plate 64 within the feedback loop 55. The aperture 62 through which the monitor beam is focused is sized to have a diameter corresponding to the $1/e^2$ point of the central lobe of a diffraction limited beam. Thus a diffraction limited beam focused through the aperture will result in an energy maximum incident onto the detector. The control system scans through the dither frequencies utilizing techniques well known in the art while synchronously sensing the input signal from the detector to produce phase correction signals having some amplitude at each frequency for which the dither signal and the input signal have a coincidence. The correction signals activate the phase control transducers to modify the contour of the deformable optical element of the resonator to produce a phase correction to the beam until the amplitude of each correction signal approaches zero. When the amplitude of all of the correction signals is zero, the output beam has a far field distribution which is near diffraction limited. It is to be recognized that varying the contour of the deformable optical element of the resonator produces a phase change to the radiation oscillating within the resonator and not an amplitude change. The deformable optical element controls the mode in which the radiation will oscillate within the resonator to produce a lowest order mode which results in an intensity maximum on the detector. Also, the relatively small distortions of the deformable optical elements typically result only in phase changes to the radiation oscillating within the resonator and do not change the relative spacing between the reflectors defining the resonator which affects the laser lines on which oscillation occurs. In the preferred embodiment only the monitor beam is dithered to impress a spatial phase modulation thereon and no undesirable frequency modulation is imposed upon the output beam transmitted to the remote target.

Although the present invention utilizes Fourier transform techniques to convert the near field phase modulation of the output beam into far field amplitude modulation at the focal plane, the present invention is also adapted for the utilization of phase detection techniques, such as interferometry, to sample the phase modulations of the monitor beam resulting from phase perturbations within the resonator to provide the correction signals to the phase control transducers. Additionally it is to be recognized that regardless of the sampling techniques which are employed, the control system must have an adequate bandwidth to correct for slowly varying phase distortions due to thermal loading of the optical components of the resonator as well as higher frequency temporal variations due to misalignment of the optical elements as a result of environmental considerations or rapid fluctuations of the refractive index with the gain medium.

Figure 2:
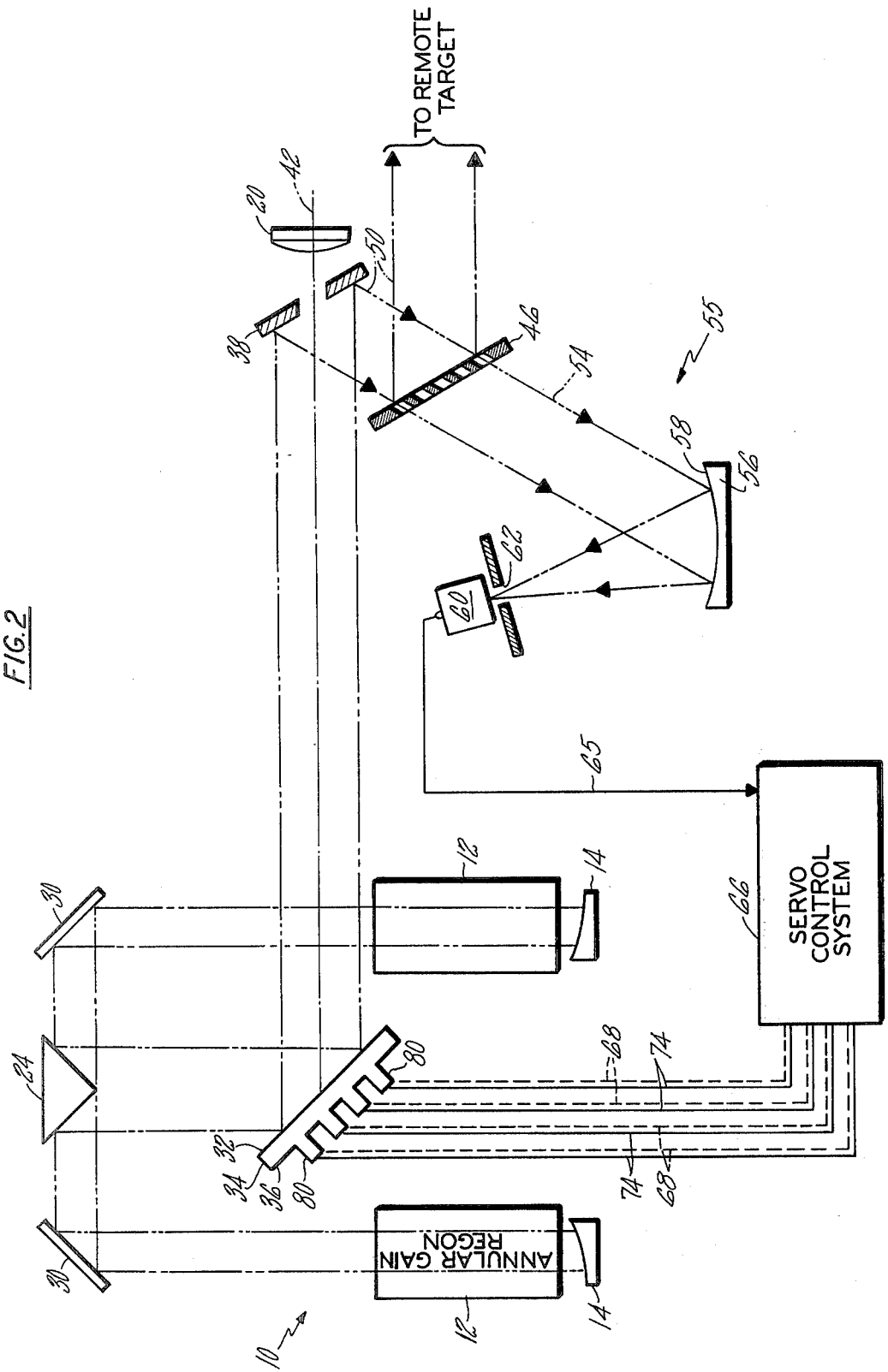
FIG. 2 is a simplified schematic of an embodiment of the present invention wherein the resonator has adaptive optics.

Referring now to FIG. 2 which shows an embodiment of the present invention wherein transducers 80 are positioned on the back surface 36 of the folding mirror 34 within the resonator 10. In this embodiment, the multidither signals 68 are provided to the transducers 80 to distort the reflective surface 32 to impress a spatial phase modulation on the intracavity radiation resulting in an output beam having spatial phase modulation. A portion of the output beam 50 is directed onto the reflective surface 58 of the collector mirror 56 and focused onto the detector 60 through the aperture 62 as hereinbefore described to produce an input signal 65 to the servo control system 66 which synchronously monitors the input signal with the multidither signals 68 to produce multicorrection signals 74 as hereinbefore described. The direct current multicorrection signals 68 activate the transducers 80 attached to the back surface 36 of the folding mirror 34 to provide distortion to the reflective surface 32 to compensate for temporally varying phase perturbations within the cavity. It is to be recognized that each of the plurality of transducers attached to the back surface of the folding mirror can be utilized in both the dithering mode to provide phase modulation dither and phase correction mode to provide phase correction or the transducers 80 may consist of a mixture of dither and phase control transducers or a set of individual transducers each of which are capable of accommodating both dither and phase control appropriately positioned on the back surface 36. Additionally it is to be recognized that the transducers may be attached to any optical component defining the resonator 10 which is capable of being deformed. The system as shown in FIG. 2 operates in a manner similar to the system as shown in FIG. 1 with the notable exception that the output beam resulting from the configuration as shown in FIG. 2 is phase modulated.

FIG. 3 shows a further embodiment of the present invention wherein radiation reflected from a remote target (not shown) is collected by the collector mirror 56 to provide the monitor beam 54 to the feedback loop 55 wherein the monitor beam is focused through the aperture 62 onto the detector 60. The operational characteristics of the configuration shown in FIG. 3 are similar to the operational characteristics of the configuration shown in FIG. 2 with the exception that the embodiment shown in FIG. 3 is particularly adapted for compensating for temporally varying phase perturbations along the path of the output beam produced by variations in the index of refraction of the gases in the atmosphere due to thermal blooming, air turbulence and the like during propagation of a high power beam to a remote target. The embodiment as shown in FIG. 3 has the advantage over prior art systems utilized to compensate for thermal blooming and atmospheric turbulence effects on a transmitted beam in that the phase corrections are made to the radiation within the resonator. Since the radiation within the resonator is typically repeatably reflected between the reflectors defining the resonator before it is coupled out of the resonator as an output beam, a small distortion of an actively deformable mirror will produce a phase correction to the intracavity radiation which is magnified by each successive reflection from the reflected surface of the deformed mirror. Thus only a small deformation of the mirror surface is required to obtain a relatively large phase change in the output beam. In prior art devices, large phase perturbations in the transmitted beam require large distortions in the phase correction apparatus to compensate for the phase perturbations.

Although this invention has been shown and described with respect to preferred embodiments thereof it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. A resonator feedback system comprising:
   a resonator defined at one end by a first reflector and at the other end by a second reflector wherein at least the first reflector has a reflective surface capable of being deformed;
   means for providing an output beam from the resonator;
   means for sampling a portion of the output beam to provide a monitor beam to a feedback loop; and
   a feedback loop including;
      a collector mirror having a concave reflective surface in optical communication with the means for sampling a portion of the output beam for focusing the monitor beam onto a detector;
      first actuator means, orderly disposed on a back surface of the collector mirror, responsive to multidither signals from a servo control system for deforming the concave reflective surface of the collector mirror to impress a phase modulation on the monitor beam;
      a plate, located at a focal plane of the concave reflective surface of the collector mirror, having an aperture located therein for transmitting a portion of the monitor beam therethrough;
      a detector, located juxtaposed the plate, for sensing a monitor beam focused onto said detector to provide an electrical input signal wherein the concave reflective surface of the collector mirror is in optical communication with the detector through the aperture in the plate;
      a servo control means for providing multidither signals to the first actuator means and for synchronously monitoring the electrical input signals with the multidither signals to provide multicorrection signals to second actuator means; and
      second actuator means, orderly disposed on a back surface of the first reflector, responsive to the multicorrection signals for deforming the reflective surface of the first reflector.

2. The invention in accordance with claim 1 wherein the aperture within the plate has a diameter substantially equal to an $1/e^2$ point of a central lobe in the intensity distribution of the monitor beam at the focal plane of the reflective surface of the collector mirror.

3. The invention in accordance with claim 1 wherein the means for sampling a portion of the output beam to provide a monitor beam is a scraper mirror having a plurality of apertures for transmitting a minor portion of the output beam to provide the monitor beam and a reflective surface in optical communication with the means for providing an output beam for reflecting a major portion of the output beam to a target.

4. The invention in accordance with claim 1 further including a gain medium disposed within the resonator.

5. The invention in accordance with claim 4 wherein the gain medium has an annular configuration.

6. The invention in accordance with claim 1 wherein the second actuator means is a plurality of second actuators wherein each of the second actuators is responsive to a multicorrection signal for deforming one zone of the reflective surface of the first reflector without changing the relative separation between the first and second reflectors defining the resonator.

7. The invention in accordance with claim 6 wherein each of the plurality of second actuators is a piezoelectric transducer.

8. The invention in accordance with claim 1 wherein the first actuator means is a plurality of first actuators wherein each of the first actuators is responsive to a multidither signal for deforming one zone of the concave reflective surface of the collector mirror for impressing phase modulations on the monitor beam.

9. The invention in accordance with claim 8 wherein each of the plurality of first actuators is a piezoelectric transducer.

10. A resonator feedback system comprising:
   a resonator defined at one end by a first reflector and at the other end by a second reflector wherein at least the first reflector has a reflective surface capable of being deformed;
   actuator means orderly disposed on a back surface of the first reflector for deforming the reflective surface of said first reflector wherein said actuator means are responsive to multidither signals and multicorrection signals from a servo control system;
   means for providing an output beam from the resonator;
   means for sampling a portion of the output beam to provide a monitor beam to a feedback loop; and
   a feedback loop including;
      a collector mirror having a concave reflective surface in optical communication with the means for sampling a portion of the output beam for focusing the monitor beam onto a detector;
      a plate located at a focal plane of the concave reflective surface of the collector mirror, having an aperture located therein for transmitting a portion of the monitor beam therethrough;
      a detector located juxtaposed the plate for sensing a monitor beam focused onto said detector to provide an electrical input signal wherein the concave reflective surface of the collector mirror is in optical communication with the detector through the aperture in the plate;
      a servo control means for providing multidither signals to the actuator means and for synchronously monitoring the electrical input signal with the multidither signals to provide multicorrection signals to the actuator means wherein said actuator means are responsive to the multidither signals for distorting the reflective surface of the first reflector to impress a spatial phase modulation on radiation oscillating within the resonator and are responsive to the multicorrection signals for distorting said reflective surface.

11. A resonator feedback system comprising:
   a resonator defined at one end by a first reflector and at the other end by a second reflector wherein at least the first reflector has a reflective surface capable of being deformed;
   actuator means orderly disposed on a back surface of the first reflector for deforming the reflective surface of said first reflector wherein said actuator means are responsive to multidither signals and multicorrection signals from a servo control system;
   means for providing an output beam from the resonator to a remote target; and
   a feedback loop including:
      a collector mirror having a concave reflective surface for collecting a portion of the output beam reflected from a remote target to provide a monitor beam and for focusing the monitor beam onto a detector;
      a plate located at a focal plane of the concave reflective surface of the collector mirror having an aperture located therein for transmitting at least a portion of the monitor beam therethrough;
      a detector located juxtaposed the plate for sensing a monitor beam focused onto said detector to provide an electrical input signal wherein the concave reflective surface of the collector mirror is in optical communication with the detector through the aperture in the plate;
      a servo control means for providing multidither signals to the actuator means and for synchronously monitoring the electrical input signal with the multidither signals to provide multicorrection signals to the actuator means wherein said actuator means are responsive to the multidither signals for dithering the reflective surface of the first reflector.

12. The invention in accordance with claim 10 or 11 wherein the actuator means is a plurality of transducers wherein a portion of the plurality of transducers are responsive to the multidither signals and the remaining transducers are responsive to the multicorrection signals.

13. The invention in accordance with claim 10 or 11 wherein the aperture within the plate has a diameter substantially equal to an $1/e^2$ point of a central lobe in the intensity distribution of the monitor beam at the focal plane of the reflective surface of the collector mirror.

14. A method for obtaining an output beam having a near diffraction limited intensity distribution from a resonator having at least one optical element with a reflective surface adapted for being actively deformed comprising:
   providing an output beam from the resonator;
   sampling a portion of the output beam to provide a monitor beam;
   directing the monitor beam to a collector mirror within a feedback loop;
   focusing the monitor beam with the collector mirror through an aperture in a plate, located at the focal plane of the collector mirror, onto a detector wherein phase variations in the monitor beam resulting from phase perturbation to radiation oscillating within the resonator are Fourier transformed to amplitude variations at the focal plane;
   providing multidither signals from a servo control system to a plurality of first actuators orderly disposed on a back surface of the collector mirror for providing zonal deformations of a concave reflective surface of the collector mirror to impress phase modulations on the monitor beam;
   detecting the amplitude variations of the Fourier transformed phase perturbations with the detector to provide an electrical input signal having amplitude variations proportional to phase perturbations of radiation oscillating within the resonator;

synchronously monitoring the electrical input signal with the multidither signals within the servo control system to provide multicorrection signals each of which have some amplitude at a frequency of each dither signal of the multidither signals;

activating a plurality of second actuators, orderly disposed on a back surface of the optical element of the resonator capable of being deformed, with the multicorrection signals to provide zonal deformations of the reflective surface of said optical element to induce changes in the phase of the radiation oscillating within the resonator for compensating phase perturbations of said radiation resulting from mirror misalignment, index of refraction variations within a gain medium within the resonator, and the like; and continuing to activate the second actuators until the amplitude of each of the multicorrection signals approach zero for obtaining an output beam having an intensity distribution near diffraction limited.

15. The invention in accordance with claim 14 further including controlling the multidither signals to the plurality of first actuators to impress phase modulations, on the monitor beam, having an amplitude less than one-tenth of a wavelength of the output beam.

16. The invention in accordance with claim 14 wherein the multidither signals are provided as a plurality of separate sinusoidal signals each having a discrete frequency, none of which are harmonic of the other.

17. A method for obtaining an output beam having a near diffraction limited intensity distribution incident on a remote target from a resonator having at least one optical element with a reflective surface adapted for being actively deformed comprising:

directing an output beam from the resonator to a remote target;

collecting radiation reflected from the remote target with a collector mirror having a concave reflective surface to provide a monitor beam;

focusing the monitor beam with said concave reflective surface of the collector mirror through an aperture in a plate, located at a focal plane of the collector mirror, onto a detector wherein phase variations in the monitor beam, resulting from phase perturbations in the output beam from index of refraction variations along the path of the output beam due to thermal blooming or the like, are Fourier transformed to amplitude variations at the focal plane;

providing multidither signals, from a servo control system, at discrete frequencies to each of a plurality of actuators orderly disposed on a back surface of the optical element of the resonator capable of being deformed for providing zonal deformations of the reflective surface of the optical elenent to impress phase modulations on radiation oscillating within the resonator;

detecting the amplitude variations of the Fourier transformed phase perturbations with the detector to provide an electrical input signal having amplitude variations proportional to the phase perturbations in the output beam;

synchronously monitoring the electrical input signal with the multidither signals with the servo control system to provide multicorrection signals each of which have some amplitude at a frequency of each dither signal of the multidither signals;

activating each of the actuators, orderly disposed on the back surface of the optical element of the resonator capable of being deformed, with the multicorrection signals to provide zonal deformations of the reflective surface of said optical element to induce changes in the phase of radiation oscillating within the resonator for compensating phase perturbations in the output beam; and continuing to activate the actuators until the amplitude of each of the multicorrection signals approaches zero for obtaining an output beam, at the target, having an intensity distribution near diffraction limited.

18. A method for obtaining an output beam having a near diffraction limited intensity distribution from a resonator having at least one optical element with a reflective surface adapted for being actively deformed comprising:

providing an output beam from the resonator;

sampling a portion of the output beam to provide a monitor beam;

directing the monitor beam to a collector mirror within a feedback loop;

focusing the monitor beam with the collector mirror through an aperture in a plate, located at a focal plane of the collector mirror, onto a detector wherein phase variations in the monitor beam resulting from phase perturbations to radiation oscillating within the resonator are Fourier transformed to amplitude variations at the focal plane;

providing multidither signals from a servo control system at discrete frequencies to each of a plurality of actuators orderly disposed on a back surface the optical element of the resonator capable of being deformed for providing zonal deformations of the reflective surface of said optical element to impress phase modulations on the monitor beam;

detecting the amplitude variations of the Fourier transformed phase perturbations with the detector to provide an electrical input signal having amplitude variations proportional to the phase perturbations of radiation oscillating within the resonator;

synchronously monitoring the electrical input signal with the multidither signals within the servo control system to provide multicorrection signals each of which have some amplitude at a frequency of each dither signal of the multidither signals;

activating each of the actuators, orderly disposed on the back surface of the optical element of the resonator capable of being deformed, with the multicorrection signals to provide zonal deformations of the reflective surface of said optical element to induce changes in the phase of radiation oscillating within the resonator for compensating phase perturbations resulting therein from mirror misalignment, index of refraction variations within the gain medium, thermal distortions of the optical elements defining the resonator, and the like; and continuing to activate the actuators until the amplitude of each of the multicorrection signals approaches zero for obtaining an output beam having an intensity distribution near diffraction limited.

* * * * *